US010075400B2

(12) United States Patent
Humad et al.

(10) Patent No.: US 10,075,400 B2
(45) Date of Patent: *Sep. 11, 2018

(54) TRANSMISSION AND PRESENTATION OF PRIVATE CONTENT IN ELECTRONIC MESSAGES

(71) Applicant: International Business Machines Corporation, Armonk, NY (US)

(72) Inventors: Chitwan Humad, Bavdhan (IN); Rajesh V. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,564

(22) Filed: May 19, 2017

(65) Prior Publication Data

US 2017/0257334 A1    Sep. 7, 2017

Related U.S. Application Data

(63) Continuation of application No. 14/755,310, filed on Jun. 30, 2015, now Pat. No. 9,692,719.

(51) Int. Cl.
*G06F 7/04* (2006.01)
*H04L 12/58* (2006.01)
*H04L 29/06* (2006.01)

(52) U.S. Cl.
CPC ............ *H04L 51/12* (2013.01); *H04L 51/14* (2013.01); *H04L 51/16* (2013.01); *H04L 51/22* (2013.01); *H04L 63/10* (2013.01)

(58) Field of Classification Search
CPC ................................ H04L 63/10; H04L 51/22

USPC ........................................... 726/2–10, 26–30
See application file for complete search history.

(56) References Cited

U.S. PATENT DOCUMENTS

| | | | |
|---|---|---|---|
| 6,247,045 B1 | 6/2001 | Shaw et al. | |
| 6,636,965 B1 | 10/2003 | Beyda et al. | |
| 7,130,887 B2 | 10/2006 | Goldberg | |
| 7,406,596 B2* | 7/2008 | Tararukhina | ............ H04L 12/24 713/165 |
| 7,747,692 B2 | 6/2010 | Larsen | |
| 8,601,605 B2* | 12/2013 | Someshwar | ........ H04L 63/0227 358/1.14 |
| 2001/0039504 A1* | 11/2001 | Linberg | ................ G06F 19/322 705/3 |
| 2003/0084347 A1* | 5/2003 | Luzzatto | ................ H04L 12/58 726/15 |

(Continued)

OTHER PUBLICATIONS

Sharma et al., "Content sharing in information storage and retrieval system using tree representation of documents," 2014 Conference on IT in Business, Industry and Government (CSIBIG) Year: 2014 pp. 1-4.*

(Continued)

*Primary Examiner* — Roderick Tolentino
(74) *Attorney, Agent, or Firm* — David S. Richart; Arnold B. Bangali (57) ABSTRACT

An email is received. The email consists of a common content, at least one recipient for the common content, a private content, and at least one recipient for the private content. Each of the at least one recipients for the private content is a recipient of the common content. The common content is stored in a first storage location, and the private content is stored in a second storage location.

18 Claims, 3 Drawing Sheets

(56) References Cited

U.S. PATENT DOCUMENTS

| | | | | |
|---|---|---|---|---|
| 2006/0184628 | A1* | 8/2006 | Coley | H04L 12/583 709/206 |
| 2007/0113101 | A1* | 5/2007 | LeVasseur | H04L 51/14 713/189 |
| 2008/0187140 | A1* | 8/2008 | McGillian | H04L 12/58 380/278 |
| 2009/0214034 | A1 | 8/2009 | Mehrotra et al. | |
| 2009/0319623 | A1 | 12/2009 | Srinivasan et al. | |
| 2013/0268752 | A1* | 10/2013 | Morecki | H04L 9/0822 713/155 |
| 2014/0122883 | A1 | 5/2014 | LeVasseur et al. | |
| 2015/0271122 | A1* | 9/2015 | Jalisatgi | H04L 51/18 713/158 |
| 2015/0363612 | A1* | 12/2015 | Li | G06F 21/6263 726/26 |
| 2017/0005964 | A1 | 1/2017 | Humad et al. | |
| 2017/0006031 | A1 | 1/2017 | Humad et al. | |

OTHER PUBLICATIONS

Kounelis et al., "Secure and privacy-enhanced e-mail system based on the concept of proxies," 2014 37th International Convention on Information and Communication Technology, Electronics and Microelectronics (MIPRO) Year: 2014 pp. 1405-1410.*

Kounelis et al. "Secure and Privacy-enhanced E-Mail System based on the Concept of Proxies", 2014 37th International Convention on Information and Communication Technology, Electronics and Microelectronics (MIPRO), May 26-30, 2014, Opatija, Croatia, DOI: 10.1109/MIPRO.2014.6859787, pp. 1405-1410.

Sharma et al., "Content Sharing in Information Storage and Retrieval System Using Tree Representation of Documents", 2014 Conference on IT in Business, Industry and Government (CSIBIG), © 2014 IEEE, DOI: 10.1109/CSIBIG.2014.7056941, 4 pages.

List of IBM Patents or Patent Applications Treated as Related. Filed May 19, 2017. 2 pages.

* cited by examiner

TRANSMISSION AND PRESENTATION OF PRIVATE CONTENT IN ELECTRONIC MESSAGES

BACKGROUND OF THE INVENTION

The present invention relates generally to the field of electronic mail, and more particularly to recipient-specific electronic message content.

Electronic mail, or emails, are digital messages that are exchanged between a sender and one or more recipients. The emails are transferred between devices connected over a network, such as the Internet. Email programs that allow a user to access and manage the user's emails operate on a client-server model whereby messages are sent to and stored in a networked server for the recipient, thereby allowing for non-real time correspondence between the sender and the recipient.

It is often desirable for the sender of an email to privately explain, clarify, or otherwise communicate with a particular recipient of the email without the other recipients of the email having access to the explanation or clarification. Certain email programs allow for the sending of private content with an email by encrypting the private message, where the private message is embedded in the common content of the email, and later decrypting the private content when the email is received through extra client-server communication. For example, a recipient of private content may insert an encryption key, which would be sent to the recipient in a separate communication either before or after receiving the email.

SUMMARY

Embodiments of the present invention include a method for transferring and utilizing an email. In one embodiment, an email is received. The email consists of a common content, at least one recipient for the common content, a private content, and at least one recipient for the private content. Each of the at least one recipients for the private content is a recipient of the common content. The common content is stored in a first storage location, and the private content is stored in a second storage location.

DETAILED DESCRIPTION

Embodiments of the present invention recognize that current methods of securely transferring private, recipient-specific content in an email involves excessive client-server communications. For example, the private content in an email may be secured by embedding and encrypting the private content in the email and transferring the same email content to all recipients, including transferring the private content to recipients not intended to view the private content. For a recipient of the private content to view the content, the email program may prompt the recipient for an encryption key, which must be previously transferred to the recipient in a separate email. Such methods requiring additional client-server communications consume resources for email programs and servers, for example creating bandwidth consumption issues, and consume time for email users. Embodiments of the present invention recognize that emails are often handled in public areas, such as at a user's place of employment, and that a user's privacy is of high importance where private subject matter is included in an email.

Embodiments of the present invention provide a program for generating, transferring, and utilizing an email with a common portion and a private portion for specific recipients.

Emails are digital messages that are exchanged from a sender to one or more recipients across a network. An individual email typically includes a message body for text content and a message header with fields for descriptive information. For example, a message header typically includes address fields such as a "From" field for the sender's email address and a "To" field, a "Bcc" field, and a "Cc" field for one or more recipients' email addresses. An email may include an attachment, or a computer file that is transferred along with the email to all recipients.

Figure 1:
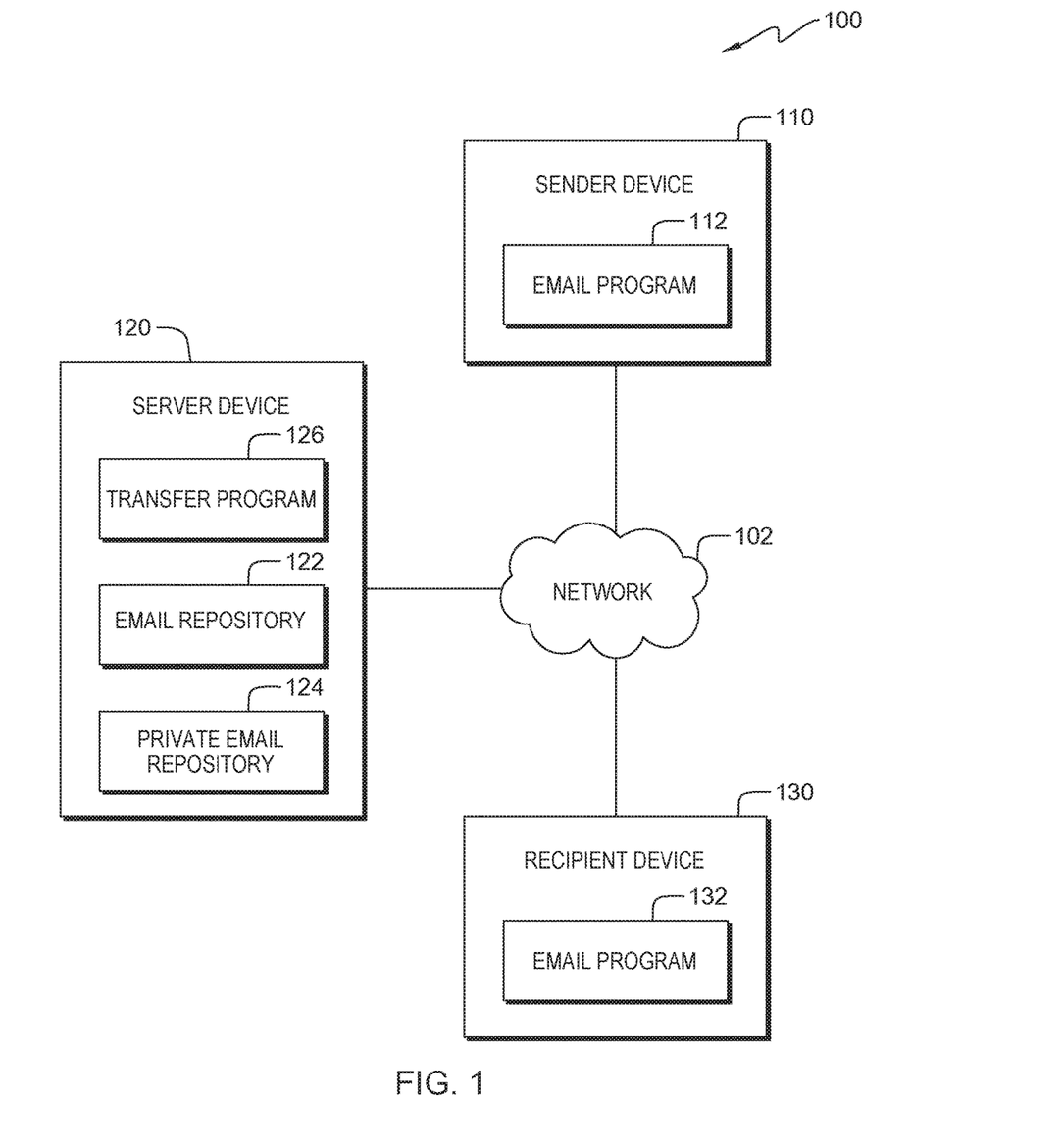
FIG. 1 is a functional block diagram of a distributed data processing environment, in accordance with an embodiment of the present invention.

The present invention will now be described in detail with reference to the Figures. FIG. 1 is a functional block diagram illustrating distributed data processing environment 100, in accordance with an embodiment of the present invention. FIG. 1 is for illustrative purposes and does not imply any limitations with regard to the environments in which embodiments of the present invention may be implemented.

In the illustrated embodiment, distributed data processing environment 100 includes sender device 110, server device 120, and recipient device 130. Sender device 110, server device 120, and recipient device 130 are interconnected through network 102. In various embodiments, network 102 can be a local area network (LAN), a telecommunications network, a wide area network (WAN) such as the Internet, or any combination of the three, and can include wired, wireless, or fiber optic connections. In general, network 102 may be any combination of connections and protocols supports communications between sender device 110, server device 120, recipient device 130, and any other computer connected to network 102, in accordance with an embodiment of the present invention.

In general, sender device 110 may be any electronic device or combination of electronic devices capable of executing computer readable program instructions. In example embodiments, sender device 110 may be a workstation, personal computer, personal digital assistant, or mobile phone. In an embodiment, sender device 110 may be a computer system utilizing clustered computers and components (e.g., database server devices, application server devices) that act as a single pool of seamless resources when accessed by elements of data processing environment 100, such as in a cloud computing environment. Recipient device 130 is substantially similar to sender device 110 and includes substantially similar components. In the illustrated embodiment, sender device 110 includes email program 112 and recipient device 130 includes email program 132.

Email program 112 may be a computer program, application, or subprogram of a larger program that provides access to, and communicates with, transfer program 126, email repository 122, and private email repository 124, located on server device 120 in the illustrated embodiment. Email program 112 may provide functions for transferring, accessing, and handling emails such as sending, receiving, retrieving, displaying, responding (e.g., replying, forwarding), composing, editing, and deleting, in accordance with an embodiment of the present invention. In the illustrated embodiment, a user of sender device 110 may utilize email program 112 to access server device 120, through network 102. For example, in a web application, a user of a personal computer may utilize a web browser (i.e., email program 112) to access, through network 102, the user's emails stored on a remote web server. In an alternative embodiment, email program 112 may be located on another networked computer (not shown), and a user of sender device 110 may access and utilize email program 112 through network 102. Email program 132, located on recipient device 130 in the illustrated embodiment, is substantially similar to email program 112.

In an embodiment, email program 112 may be connected to one or more user interface devices to allow a user to manipulate emails or otherwise utilize email program 112. The term "user interface", as used herein, refers to the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in response to the perceived steep learning curve of command-line interfaces, which required commands to be typed on the keyboard. The actions in GUIs are often performed through direct manipulation of the graphical elements.

In general, server device 120 may be any electronic device or combination of electronic devices capable of executing computer readable program instructions. In example embodiments, server device 120 may be a workstation, personal computer, personal digital assistant, or mobile phone. In an embodiment, server device 120 may be a computer system utilizing clustered computers and components (e.g., database server devices, application server devices) that act as a single pool of seamless resources when accessed by elements of distributed data processing environment 100, such as in a cloud computing environment. In the illustrated embodiment, server device 120 includes transfer program 126, email repository 122, and private email repository 124.

Transfer program 126 may be a computer program, application, or subprogram of a larger program that provides access to, and communicates with, email program 112, email repository 122, private email repository 124, and email program 132. Transfer program 126 may provide functions for storing, transferring, and accessing emails, in accordance with an embodiment of the present invention. In the illustrated embodiment, transfer program 126, located on server device 120, may directly access and communicate with email repository 122 and private email repository 124, located on server device 120, and transfer program 126 may communicate with email program 112 and email program 132 through network 102.

Email repository 122 contains emails stored by, transferred by, accessed by, or otherwise utilized by email program 112, transfer program 126, and email program 132. In the illustrated embodiment, the emails include a common message portion ("common content") for one or more recipients. As an example, email program 112 may send an email to transfer program 126, transfer program 126 may store the common content of the email in email repository 122, corresponding to the recipient for the common content, and email program 132 may retrieve the common content from email repository 122. In an embodiment, email repository 122 may contain emails corresponding to one or more users of email program 132.

In the illustrated embodiment, email repository 122 is located on server device 120 and may be accessed by, and communicate with, email program 112 and email program 132 through network 102. In an alternative embodiment, email repository 122 may be located on recipient device 130, and email program 132 may directly access and communicate with email repository 122, and email program 112 may access and communicate with email repository 122 through network 102. In yet another embodiment, email repository 122 may be located on a different networked computer (not shown), and email program 112 and email program 132 may access and communicate with email repository 122 through network 102.

Private email repository 124 contains emails transferred by, accessed by, or otherwise utilized by email program 112, email program 132, and transfer program 126. In the illustrated embodiment, the emails include a private message portion ("private content") for one or more recipients where each recipient of the private content is also a recipient of the common content of the email. As an example, email program 112 may send an email to transfer program 126, transfer program 126 may store the private content in private email repository 124, corresponding to the recipient for the private content, and email program 132 may retrieve the private content from email repository 124. In an embodiment, private email repository 124 may contain emails corresponding to one or more users of email program 132. In the illustrated embodiment, private email repository 124 may be accessed by, and communicate with, email program 112 and email program 132 through network 102. In an alternative embodiment, private email repository 124 may be located on recipient device 130, and email program 132 may directly access and communicate with private email repository 124, and email program 112 may access and communicate with private email repository 124 through network 102. In yet another embodiment, private email repository 124 may be located on a different networked computer (not shown), and email program 112 and email program 132 may access and communicate with private email repository 124 through network 102.

Email repository 122 and private email repository 124 may be implemented using any non-volatile storage media known in the art. For example, email repository 122 and private email repository 124 may be implemented with a tape library, optical library, one or more independent hard disk drives, or multiple hard disk drives in a redundant array of independent disks (RAID). Similarly, email repository 122 and private email repository 124 may be implemented using any suitable storage architecture known in the art. For example, email repository 122 and private email repository 124 may be implemented with a relational database or an object-oriented database.

Figure 2:
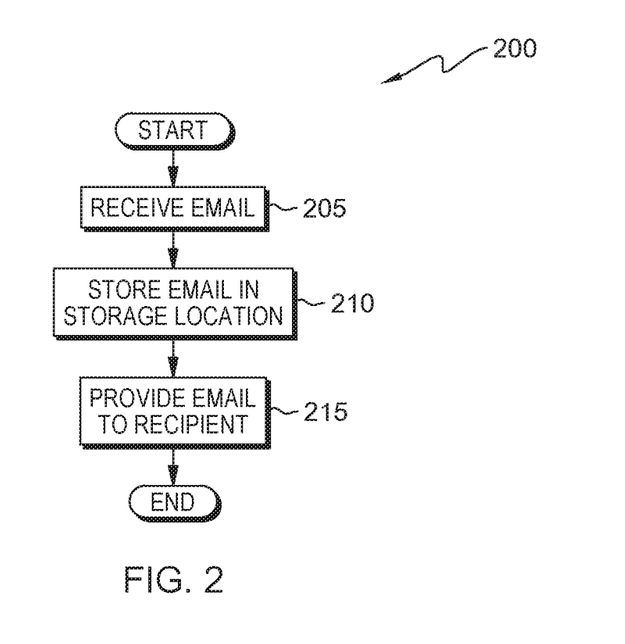
FIG. 2 is a flowchart of operational steps for transferring and utilizing an email with a common portion and a private portion, in accordance with an embodiment of the present invention.

FIG. 2 is a flowchart of workflow 200 illustrating operational steps for transferring and utilizing an email with a common portion and a private portion. In the illustrated embodiment, steps of workflow 200 are performed by transfer program 126. In the illustrated embodiment, steps of workflow 200 may involve email program 112 or email program 132. In an alternative embodiment, the steps may involve any other computer program, or programs, while working with email program 112, transfer program 126, or email program 132.

Transfer program 126 receives an email (step 205). In other words, transfer program 126 receives an email from email program 112. The email may include a private content and a common content. In an embodiment, the common content and the recipients for the common content may be indicated by a user through the user interface of email program 112. In an embodiment, the common content may be, for example, text content, image content, video content, audio content, an attachment, or a combination thereof. In an embodiment, the recipients for the common content may be indicated in one or more address fields such as a "To" field, a "Cc" field, and a "Bcc" field.

In an embodiment, the private content and the recipients for the private content may be indicated by a user through the user interface of email program 112. In an embodiment, the private content may be, for example, text content, image content, video content, audio content, an attachment, or a combination thereof. In an embodiment, the email may include more than one private contents and each private content may be for one or more recipients.

In an embodiment, where email program 112 receives an indication that the email is unable to be transferred to a recipient, for example a "non-delivery report", email program 112 may provide a user the same common content and the same private content when the email is re-sent. In an embodiment, the private content may be edited by the user when the email is re-sent, through the user interface of email program 112, and the email may be re-sent with the edited content.

Transfer program 126 stores the email in a storage location (step 210). In the illustrated embodiment, transfer program 126 stores the common content of the email to email repository 122, corresponding to the recipient(s) of the common content, and stores the private content in private email repository 124, corresponding to the recipient(s) of the private content. For example, for a recipient of the common content, transfer program 126 stores the common content in email repository 122, corresponding to the recipient. For a recipient of the private content, transfer program 126 stores the common content to email repository 122, corresponding to the recipient, and additionally stores the private content in private email repository 124, corresponding to the recipient. In this manner, the private content of the email is only stored in the storage location corresponding to the recipient for the private content and is not accessible to a recipient for only the common content. In an embodiment, transfer program 126 may parse the common content and the private content of the email in order to store each message portion in separate storage locations (i.e., email repository 122 and private email repository 124, respectively).

Transfer program 126 provides the email to a recipient (step 215). In other words, transfer program 126 provides the email to email program 132. In the illustrated embodiment, transfer program 126 provides the email in response to receiving a request from email program 132 to provide the email. In an embodiment, transfer program 126 may provide the email by sending the email to email program 132 in response to the request. In an alternative embodiment, transfer program 126 may provide the email by allowing email program 132 access to the storage location in response to the request, and email program 132 may retrieve the email from the storage location. In an embodiment, email program 132 requests the email in response to receiving an indication from the recipient through the user interface of email program 132, for example an indication from the recipient to open and view the recipient's email.

In the illustrated embodiment, where transfer program 126 receives a request to provide an email that includes a private content, transfer program 126 provides only the common content of the email, from email repository 122, and does not provide the private content, from email repository 124, by default. In the illustrated embodiment, transfer program 126 provides the private content only in response to receiving a specific request from email program 132 to provide the private content.

In an embodiment, where transfer program 126 receives a request to provide an email that includes a private content, transfer program 126 may indicate to email program 132 that the recipient has received a private content. In response to receiving the indication, email program 132 may indicate to the recipient that the email includes a private content by providing, through the user interface of email program 132, a graphical icon along with the common content in the email. For example, the graphical icon may be an image of the character "!", and the icon may be placed near the recipient's email address in the header of the email.

In an embodiment, email program 132 specifically requests the private content of the email from transfer program 126 only in response to the recipient's interaction with the private content icon. For example, email program 132 may display the private content in response to the recipient double clicking on the icon. As another example, email program 132 may display the private content in response to the recipient right clicking the icon and selecting an option to display the private content. In an embodiment, email program 132 displays the private content in the context of the common content. For example, email program 132 may display the private content in a text box near the recipient's email address in the header of the email. As another example, email program 132 may display the private content in the message body of the email. In this manner, a recipient of a private content in an email is prevented from opening the email and unintentionally displaying the private content to the public.

In the illustrated embodiment, where transfer program 126 receives a request to provide an email for printing, and the email includes a private content, transfer program 126 provides only the common content of the email, from email repository 122, and does not provide the private content, from email repository 124, by default. In the illustrated embodiment, transfer program 126 provides the private content only in response to receiving a specific request from email program 132 to provide the private content.

In an embodiment, in response to receiving an indication from a recipient to print an email that includes a private content, email program 132 provides, through the user interface of email program 132, an option to print only the common content of the email, to print only the private content, or to print the private content with the common content. In an embodiment, email program 132 specifically requests the private content of the email from transfer program 126 only in response to the recipient's indication to print the private content.

In an embodiment, where transfer program 126 receives a request to provide an email for replying to or forwarding the email, and the email includes a private content, transfer program 126 provides only the common content of the email, from email repository 122, and does not provide the private content, from email repository 124. In this manner, a private content is prevented from being transferred to a recipient who was not originally indicated to receive the private content. In an embodiment, transfer program 126 may receive a new private content and recipient(s) for the new private content to be included with the reply or forwarded email.

Figure 3:
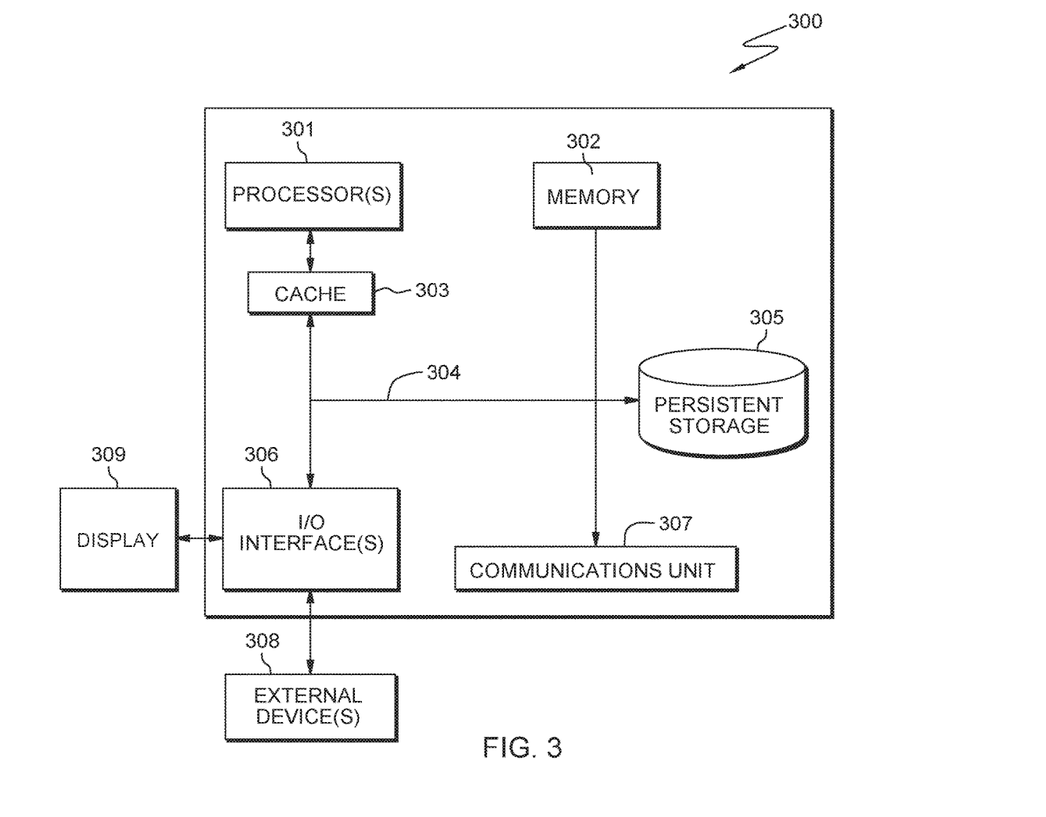
FIG. 3 is a block diagram of a system that includes email program 112, transfer program 126, or email program 132, in accordance with an embodiment of the present invention.

FIG. 3 depicts computer 300 illustrating an example of a system that includes email program 112, transfer program 126, or email program 132. Computer 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   prompting, by one or more computer processors, a set of recipients of common content of an email for a first key, wherein:
   the email comprises:
   the common content, the set of recipients of the common content, private content, and a set of recipients of the private content, and the set of recipients of the common content includes the set of recipients of the private content;
   providing, by one or more computer processors, the common content from a first storage location to the set of recipients of the common content, in response to verifying the first key;
   prompting, by one or more computer processors, the set of recipients of the private content for a second key, wherein the second key is not the first key;
   and providing, by one or more computer processors, the private content from a second storage location to the set of recipients of the private content, in response to verifying the second key.

2. The method of claim 1, further comprising:
   providing, by one or more computer processors, a graphical notification that the email includes the private content, wherein the graphical notification is located in the header of the email.

3. The method of claim 2, further comprising:
   responsive to a request by the at least one recipient of the private content to print the email, providing, by one or more computer processors, an option to print one or more of the following: only the common content of the email, only the private content, and the private content with the common content.

4. The method of claim 2, wherein the request to provide the private content comprises an interaction between the at least one recipient of the private content and the graphical notification.

5. The method of claim 1, further comprising:
   sending, by one or more computer processors, the email to a new recipient, wherein the sent email consists of the common content.

6. The method of claim 1, further comprising:
   sending, by one or more computer processors, the email, wherein the sent email consists of the common content and a new private content.

7. A computer program product comprising:
   one or more computer readable storage media, wherein the one or more computer readable storage media are not transitory signals per se;
   and program instructions stored on the one or more computer readable storage media, the program instructions comprising:
   program instructions to prompt a set of recipients of common content of an email for a first key, wherein:
   the email comprises:
   the common content, the set of recipients of the common content, private content, and a set of recipients of the private content, and the set of recipients of the common content includes the set of recipients of the private content;

program instructions to provide the common content from a first storage location to the set of recipients of the common content, in response to verifying the first key;

program instructions to prompt the set of recipients of the private content for a second key, wherein the second key is not the first key;

and program instructions to provide the private content from a second storage location to the set of recipients of the private content, in response to verifying the second key.

8. The computer program product of claim 7, further comprising program instructions, stored on the one or more computer readable storage media, to:

provide a graphical notification that the email includes a private content, wherein the graphical notification is located in the header of the email.

9. The computer program product of claim 8, further comprising program instructions, stored on the one or more computer readable storage media, to:

responsive to a request by the at least one recipient of the private content to print the email, provide an option to print one or more of the following: only the common content of the email, only the private content, and the private content with the common content.

10. The computer program product of claim 8, wherein the request to provide the private content comprises an interaction between the at least one recipient of the private content and the graphical notification.

11. The computer program product of claim 7, further comprising program instructions, stored on the one or more computer readable storage media, to:

send the email to a new recipient, wherein the sent email consists of the common content.

12. The computer program product of claim 7, further comprising program instructions, stored on the one or more computer readable storage media, to:

send the email, wherein the sent email consists of the common content and a new private content.

13. A computer system comprising:

one or more processors;

one or more computer readable storage media, wherein the one or more computer readable storage media are not transitory signals per se; and program instructions stored on the one or more computer readable storage media, the program instructions comprising:

program instructions to prompt a set of recipients of common content of an email for a first key, wherein;

the email comprises: the common content, the set of recipients of the common content, private content, and a set of recipients of the private content, and the set of recipients of the common content includes the set of recipients of the private content;

program instructions to provide the common content from a first storage location to the set of recipients of the common content, in response to verifying the first key;

program instructions to prompt the set of recipients of the private content for a second key, wherein the second key is not the first key;

and program instructions to provide the private content from a second storage location to the set of recipients of the private content, in response to verifying the second key.

14. The computer system of claim 13, further comprising program instructions, stored on the one or more computer readable storage media for execution by the at least one of the one or more computer processors, to:

provide a graphical notification that the email includes a private content, wherein the graphical notification is located in the header of the email.

15. The computer system of claim 14, further comprising program instructions, stored on the one or more computer readable storage media for execution by the at least one of the one or more computer processors, to:

responsive to a request by the at least one recipient of the private content to print the email, provide an option to print one or more of the following: only the common content of the email, only the private content, and the private content with the common content.

16. The computer system of claim 14, wherein the request to provide the private content comprises an interaction between the at least one recipient of the private content and the graphical notification.

17. The computer system of claim 13, further comprising program instructions, stored on the one or more computer readable storage media for execution by the at least one of the one or more computer processors, to:

send the email to a new recipient, wherein the sent email consists of the common content.

18. The computer system of claim 13, further comprising program instructions, stored on the one or more computer readable storage media, to:

send the email, wherein the sent email consists of the common content and a new private content.

* * * * *